United States Patent [19]

Powley

[11] Patent Number: 5,125,261
[45] Date of Patent: Jun. 30, 1992

[54] ANALOGUE PROBE CALIBRATION

[75] Inventor: David G. Powley, Alveston, United Kingdom

[73] Assignee: Renishaw plc, Gloucestershire, United Kingdom

[21] Appl. No.: 707,196

[22] Filed: May 28, 1991

Related U.S. Application Data

[63] Continuation of Ser. No. 486,846, Mar. 1, 1990, abandoned.

[30] Foreign Application Priority Data

Mar. 18, 1989 [GB] United Kingdom ................ 8906287

[51] Int. Cl.⁵ .............................................. B25J 1/00
[52] U.S. Cl. ...................................................... 73/1 J
[58] Field of Search .......................................... 73/1 J

[56] References Cited

U.S. PATENT DOCUMENTS

| | | |
|---|---|---|
| 4,364,182 | 12/1982 | Jones ............................ 73/1 J |
| 4,369,581 | 1/1983 | Lenz . |
| 4,372,721 | 2/1983 | Harjar et al. ................. 73/1 J |
| 4,430,796 | 2/1984 | Nakagawa . |
| 4,523,450 | 6/1985 | Herzog . |
| 4,613,866 | 9/1986 | Blood . |

FOREIGN PATENT DOCUMENTS

| | | |
|---|---|---|
| 0317967 | 5/1989 | European Pat. Off. . |
| WO90/04149 | 4/1990 | PCT Int'l Appl. . |
| 88/06710 | 9/1988 | World Int. Prop. O. . |
| 89/03509 | 4/1989 | World Int. Prop. O. . |

OTHER PUBLICATIONS

Patent Abstracts of Japan, vol. 5, No. 182 (P-90) (854), Nov. 20, 1981, JP 56110010(1).

Primary Examiner—Robert Raevis
Attorney, Agent, or Firm—Oliff & Berridge

[57] ABSTRACT

Disclosed is a method of obtaining data to determine a rotation matrix R, for rotating the axes (x,y,z) of an analogue probe coordinate system (PCS) onto the axes (X,Y,Z) of a machine coordinate system (MCS). The head (14) of the machine is driven to bring a measuring tip (16) of a stylus (12) supported by the probe for movement relative to the head (14) into engagement with a kinematic location (20). With the tip (16) fixed in the location (20) the head is then moved to six different locations. The coordinate positions of the head (14) in the machine coordinate system (MCS), and the stylus (12) in the probe coordinate system are used to set up six simultaneous equations and thus determine the rotation matrix R.

22 Claims, 2 Drawing Sheets

ANALOGUE PROBE CALIBRATION

This is a continuation of application Ser. No. 07/486,846 filed Mar. 1, 1990, now abandoned.

BACKGROUND OF THE INVENTION

The present invention relates to the calibration of an analogue probe, and to a method of operating a coordinate positioning machine (such as a coordinate measuring machine or machine tool) to which such probe is attached in order to obtain data for the calibration.

FIELD OF THE INVENTION

A typical analogue touch probe for use on a coordinate positioning machine supports a stylus for three dimensional movement relative to the head of the machine to which the probe is attached. Transducers measure the displacement of the stylus relative to the probe along three axes, which define a probe coordinate system. When the machine to which the probe is connected is operated to bring the stylus into contact with a surface, the position of the surface within the probe coordinate system may thus be measured with the transducers. The machine typically also has three transducers which measure the displacement of the head relative to a bed of the machine along three axes, defining a machine coordinate system. The position of the surface within the machine coordinate system may thus be determined by summing the position of the stylus in the probe coordinate system with the position of the head in the machine coordinate system.

However, in order to obtain an accurate measurement, it is necessary when performing the above summation to know the exact orientation of the axes of the probe coordinate system within the machine coordinate system. The present invention provides methods for obtaining data for calibrating an analogue probe to determine the orientation of the probe coordinate axes with respect to the machine coordinate axes.

SUMMARY OF THE INVENTION

According to a first aspect of the present invention there is provided a method of operating a coordinate positioning machine to obtain data for calibrating an analogue probe, the machine having a head, an analogue probe connected to the head, and means for measuring the position of the probe within a machine coordinate system, the probe supporting a stylus for movement relative to the head and having means for measuring the position of the stylus in a probe coordinate system, the method comprising the steps of:
fixing the position of a measuring tip of the stylus in the machine coordinate system;
with the position of the said measuring tip fixed, moving the head to a plurality of locations; and
at each of the locations, measuring the coordinate position of (a) the head within the machine coordinate system, and (b) the stylus within the probe coordinate system.

A second aspect of the present invention provides a method of operating a coordinate positioning machine to obtain data for calibrating an analogue probe, the machine having a head, means for measuring the position of the head within a machine coordinate system, and an analogue probe connected to the head, the probe supporting a stylus for movement relative to the head and having means for measuring the position of the stylus in a probe coordinate system, the method comprising the steps of:
measuring the coordinate position of a plurality of locations in the machine coordinate system;
positioning a measuring tip of the stylus in each of the locations;
maintaining the head in a fixed position in the machine coordinate system during the said positioning of the measuring tip; and
at each position of the measuring tip, measuring the coordinate position of the measuring tip in the probe coordinate system.

Implementation of the method of the second embodiment requires a special calibration block.

Accordingly, a third aspect of the present invention provides a coordinate positioning machine comprising:
a bed;
a head supported for movement relative to the bed;
an analogue probe connected to the head, supporting a stylus for movement through a permitted range of distance relative to the head, and having means for measuring a position of the stylus in a probe coordinate system; and
a calibration block comprising at least three locations for a sphere, each location lying within a distance of each other location which is equal to the magnitude of the permitted range of movement of the stylus in a single plane.

BRIEF DESCRIPTION OF THE DRAWINGS

Embodiments of the present invention will now be described, by way of example, and with reference to the accompanying drawings in which.

DESCRIPTION OF PREFERRED EMBODIMENT

Figure 1:
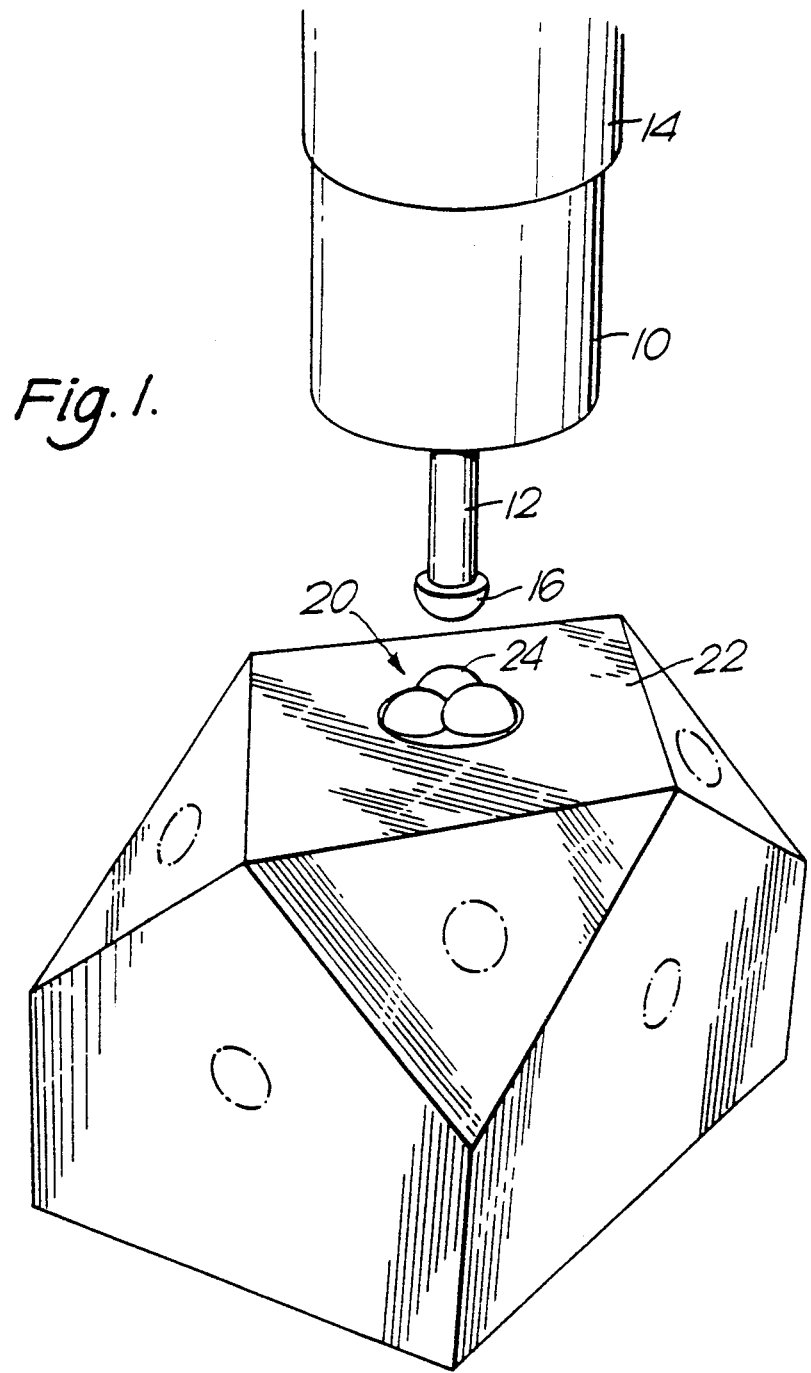
FIG. 1 shows an analogue probe in a data gathering operation according to the present invention.

An analogue probe 10 supports a stylus 12 for three dimensional movement relative to a head 14 of a coordinate positioning machine. The stylus 12 has a semispherical measuring tip 16, and it is this part of the stylus which comes into contact with a surface during a measuring operation. A typical analogue probe is described in our co-pending International Patent Application PCT/GB89/01197 and supports a stylus on three orthogonal serially mounted linear bearings. Displacement of each of the bearings is measured by a transducer (not shown), and thus the direction of extension of the bearings defines the orientation of the three axes of a probe coordinate system PCS. The stylus is continually urged to a rest position by return springs, and the transducers are zeroed at the rest position. The origin O' of the probe coordinate system PCS is thus defined by the relative position of the stylus and the probe which corresponds to zero output from the transducers. Ease of computation determines in which way the probe coordinate system is set up for measuring the position of the stylus. For example, the origin O' of the system PCS may be defined as being static relative to the head 14, i.e. the transducers are notionally measuring the position of the stylus tip 16 relative to the head 14. Alternatively the origin O' of the system may be defined as being static relative to the stylus, i.e. the transducers are notionally measuring the position of the head 14 relative to the stylus tip 16. The two situations are entirely equivalent, and references to one way of measuring the relative position of head 14 and stylus tip 16 in the probe coordinate system PCS implicitly also refers to the other.

Ideally, the three linear bearings are perfectly orthogonal, and thus the axes of the probe coordinate system PCS are perfectly square. However in practice this may not be the case, and there may be some error in the squareness of the probe coordinate axes. Usually, the manufacturer of analogue probes such as the one described above will provide information on the squareness error of the probe. Alternatively, the squareness of the probe axes may be error mapped on the machine on which the probe is to be used.

The head 14 of a coordinate positioning machine, is supported for 3-dimensional movement relative to the bed 18 of the machine. The displacement of the head 14, is measured in a machine coordinate system MCS by three transducers (which are typically scales and read heads). The position of the origin O of the machine coordinate system is arbitrary, and although it is usually defined as the geometric centre of a datum sphere provided on the bed 18, a new machine coordinate system having an origin at a different position may easily be set up (e.g. by re-setting the transducer outputs to zero). Measurement of the position of a surface is performed by operating the machine to drive the measuring tip 16 of the stylus 12 into contact with the surface, until the stylus 12 deflects from its rest position. The position of the surface within the machine coordinate system MCS is then determined by summing the coordinate position of the head 14 within the machine coordinate system MCS, and the coordinate position of the stylus tip 16 within the probe coordinate position PCS. However if the axes of the probe coordinate system PCS are not all parallel with the axes of the machine coordinate system MCS the summation will introduce inaccuracies into the measurement. Since most measurements are made to a resolution of microns, it is extremely difficult to align the probe coordinate axes sufficiently accurately with the machine coordinate axes to avoid this problem. Furthermore as stated above, probe axes may not be perfectly square, and in this situation unless the probe squareness has been error mapped it will be impossible to achieve accurate alignment.

To overcome this problem, and to determine the orientation of the probe coordinate axes in the machine coordinate system MCS, we must express the unit vectors i,j,k of the axes x,y,z of the probe coordinate system PCS in terms of the unit vectors I,J,K, of the axes X,Y,Z of the machine coordinate system MCS.

Figure 2:
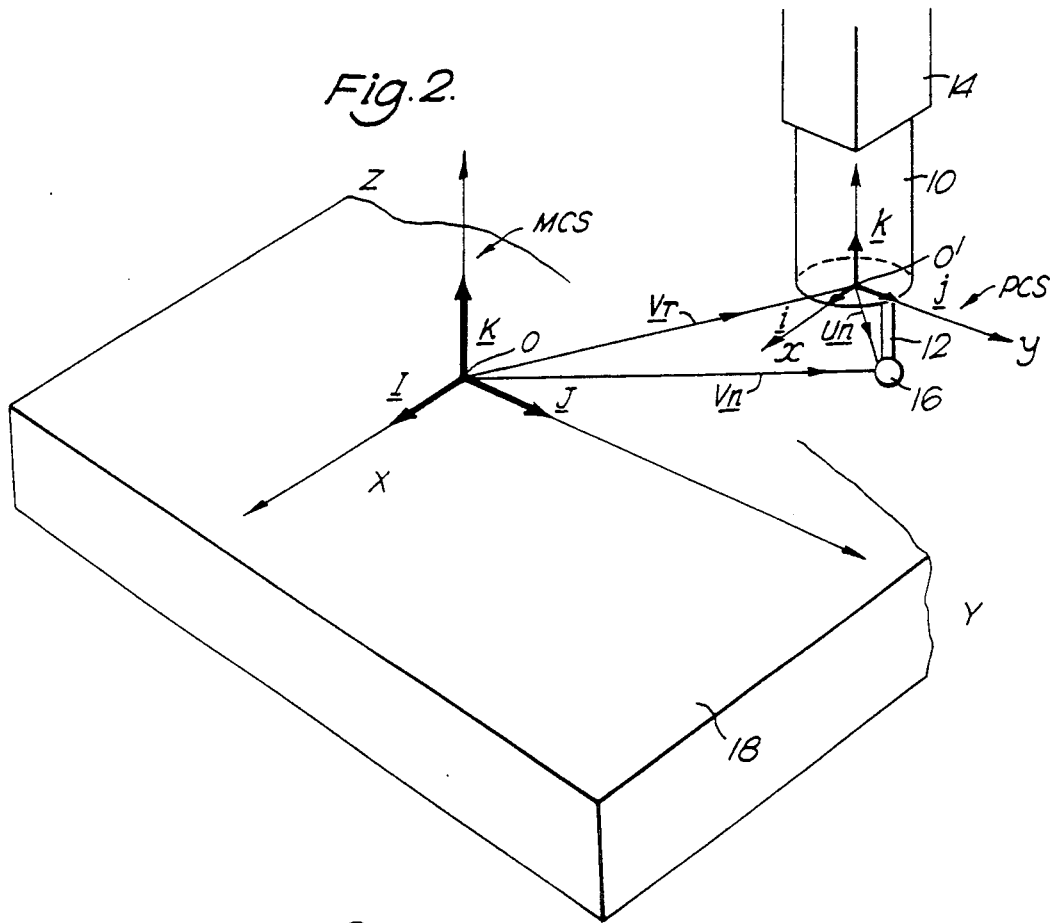
FIG. 2 shows a mathematical illustration of a coordinate positioning machine equipped with an analogue probe.

Referring now to FIG. 2, the position of a stylus tip in the probe coordinate system (as measured by the transducers in the probe) is defined by a position vector $U_n$, where:

$$U_n = f_n i + g_n j + h_n k$$

and $f_n$, $g_n$, $h_n$ are the x,y,z coordinates of the stylus tip position in the probe coordinate system, as measured by the probe transducers.

The position of the origin O' of the probe coordinate system PCS in the machine coordinate system MCS is defined by a position vector $V_T$, which gives the translation for translating the origin O' of the probe coordinate system PCS into the origin O of the machine coordinate system MCS, where:

$$V_T = F_T I + G_T J + H_T K$$

and $F_T$, $G_T$, $H_T$ are the X,Y and Z coordinates of the position of the origin O' of the probe coordinate system in the machine coordinate system.

The position of the stylus tip in the machine coordinate system is given by a position vector $V_n$ where:

$$V_n = F_n I + G_n J + H_n K$$

and $F_n$, $G_n$, $H_n$ are the X,Y,Z coordinates of the stylus tip in the machine coordinate system. Thus, any position in the machine coordinate system may be expressed in terms of a position vector $V_n$ in the probe coordinate system and the translation vector $V_T$.

$$V_n = U_n + V_T$$

Or expressing each of the vectors in terms of their components:

$$F_n I + G_n J + H_n K = (f_n i + g_n j + h_n k) + (F_T I + G_T J + H_T K)$$

As will be explained, it is possible to measure corresponding values of $F_n$, $G_n$, $H_n$ and $f_n$, $g_n$, $h_n$ while keeping the probe coordinate system PCS stationary in the machine coordinate system MCS (and thus leaving $V_T$ unperturbed). We thus have six unknowns (i,j,k and $F_T$, $G_T$, $H_T$,) in the above equation, and these may be eliminated with six simultaneous equations which may be expressed as two 3×3 matrix equations:

$$\begin{bmatrix} f_1 & g_1 & h_1 \\ f_2 & g_2 & h_2 \\ f_3 & g_3 & h_3 \end{bmatrix} \begin{bmatrix} i \\ j \\ k \end{bmatrix} = \begin{bmatrix} F_1 & G_1 & H_1 \\ F_2 & G_2 & H_2 \\ F_3 & G_3 & H_3 \end{bmatrix} \begin{bmatrix} I \\ J \\ K \end{bmatrix} - \begin{bmatrix} F_T & G_T & H_T \\ F_T & G_T & H_T \\ F_T & G_T & H_T \end{bmatrix} \begin{bmatrix} I \\ J \\ K \end{bmatrix} \quad (1)$$

or $$A_1 \times P = B_1 \times M - T \times M$$

$$\begin{bmatrix} f_4 & g_4 & h_4 \\ f_5 & g_5 & h_5 \\ f_6 & g_6 & h_6 \end{bmatrix} \begin{bmatrix} i \\ j \\ k \end{bmatrix} = \begin{bmatrix} F_4 & G_4 & H_4 \\ F_5 & G_5 & H_5 \\ F_6 & G_6 & H_6 \end{bmatrix} \begin{bmatrix} I \\ J \\ K \end{bmatrix} - \begin{bmatrix} F_T & G_T & H_T \\ F_T & G_T & H_T \\ F_T & G_T & H_T \end{bmatrix} \begin{bmatrix} I \\ J \\ K \end{bmatrix} \quad (2)$$

or $$A_2 \times P = B_2 \times M - T \times M$$

Rearranging (2)

$$T = \{[B_2 \times M] - [A_2 \times P]\} \times M^{-1}$$

Substituting in (1)

$$[A_1 \times P] = [B_1 \times M] - [B_2 \times M] + [A_2 \times P]$$

$$[A_1 - A_2]P = [B_1 - B_2]M$$

thus $$M = R \times P$$

Where R is a rotation matrix for rotating the probe coordinate system into the machine coordinate system $$[B_1 - B_2]^{-1}[A_1 - A_2]$$

The measuring operation for generating the data used in obtaining the calibration described above will now be described with reference to FIG. 1. The head 14 of the machine is driven to bring the measuring tip 16 of the stylus 12 into engagement with a kinematic location point 20 provided on a calibration block 22. The kinematic location 20 typically comprises three balls 24 (or a conical recess 24') embedded in the surface of the block, and situated relative to each other at the vertices of an equilateral triangle. The calibration block 22 is preferably provided with a plurality of faces (each for supporting a kinematic location) which face different directions in the machine coordinate system. This enables the measuring tip 16 of the stylus 12 to be brought into engagement with a kinematic location point irrespective of the direction in which the stylus 12 extends.

The engagment of the measuring tip 16 in the kinematic location point 20 fixes the position of the stylus tip 16 within the machine coordinate system MCS. With the measuring tip 16 of the stylus 12 fixed in the machine coordinate system, the head 14 is now moved to six different locations within the machine coordinate system. At each of these locations, the position of the head within the machine coordinate system is measured, and the position of the stylus tip within the probe coordinate system is measured. As stated above, it is desirable to keep the probe coordinate system PCS fixed within the machine coordinate system MCS during these measurements, since this leaves the translation vector $V_T$ unperturbed. Thus, in this embodiment of the present invention the origin O' of the probe coordinate system is defined as being static relative to the stylus tip; the transducers of the probe are thus notionally measuring the position of the head 14 relative to the stylus tip 16. As explained above, this is entirely equivalent to the converse situation where the origin of the probe coordinate system is defined as being static relative to the head, and the transducers notionally measure the position of the stylus tip 16 relative to the head. The data gathering operation described above yields six sets of machine coordinates $[F_1,G_1,H_1]$ to $[F_6,G_6,H_6]$ each giving a position of the head within the machine coordinate system, and six sets of probe coordinates $[f_1,g_1,h_1]$ to $[f_6,g_6,h_6]$ each giving a position of the head within the probe coordinate system.

If the axes of the probe coordinate system are not excessively misaligned with the axes of the machine coordinate system, and the servoing system for driving the head of the machine to a given position is sufficiently accurate, it is possible to effectively eliminate the translation vector $V_T$ from the equations (1) and (2) derived above. This is done by driving the head 14 (with the position of the measuring tip 16 of the stylus still fixed in the machine coordinate system) to a position at which the outputs of the probe transducers are zero, i.e. the stylus tip is at the origin of the probe coordinate system (or, in this specific case the head is at the origin of the probe coordinate system, since the origin O' of the PCS is defined as being static relative to the stylus). With the head 14 at this position, a new machine coordinate system may be set up whose origin coincides exactly with the origin of the probe coordinate system (thus eliminating the translation vector $V_T$ from the equations (1) and (2)). Alternatively, to avoid setting up a new machine coordinate system the position of the origin O' of the probe coordinate system within the machine coordinate system may simply be entered into equation (1). Measuring the position of the origin O' of the probe coordinate system in the machine coordinate system reduces the number of locations to which the head must be driven (in order to obtain sufficient data to solve equations (1) or (2)) to three different locations relative to the measuring tip of the stylus, not including the position to which the head was driven in order to measure the origin O'.

Figure 3:
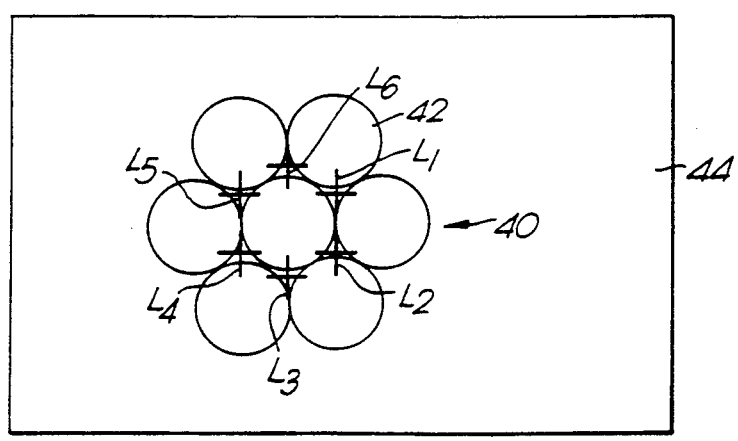
FIG. 3 is a plan view of a calibration block according to a third aspect of the present invention.

In order to perform an alternative (and less preferable) method of obtaining the necessary calibration data, a calibration block on the bed of a coordinate positioning machine having a location for the measuring tip 16 of the stylus 12, is provided. Such a block is illustrated in FIG. 3. This location 40 comprises six balls 42 packed closely together in the shape of a hexagon, and embedded in the surface of a calibration block 44. Such a location point provides six kinematic locations $L_1$ to $L_6$ in close proximity. The locations $L_1$ to $L_6$ must all be close enough to each other in a given plane to allow the measuring tip 16 of the stylus 12 to engage each location without moving the probe. It is not essential for the locations to be made with balls; any arrangement which provides three mutually convergent surfaces may suffice. Another option for the locations would be a number of conical recesses (such as the one shown at 24' in FIG. 1).

In order to obtain the calibration data using this second method, the position of the locations $L_1$ to $L_6$ in the machine coordinate system is first measured (e.g. using a probe which has already been calibrated). The head 14 of the machine is then driven to bring the measuring tip 16 of the stylus into engagement with one of the six kinematic locations provided by the location point 40. The position of the head 14 within the machine coordinate system is then kept fixed, and the measuring tip 16 of the stylus is moved into each of the kinematic locations $L_1$ to $L_6$ in turn. Thus, we now have the positions of six points in space as measured in the machine coordinate system (giving $[F_1,G_1,H_1]$ to $[F_6,G_6,H_6]$), and also the positions of the same six points as measured in the probe coordinate system (giving $[f_1,g_1,h_1]$ to $[f_6,g_6,h_6]$). Since in this embodiment of the present invention the head 14 is kept stationary in the machine coordinate system, the origin O' of the probe coordinate system is defined as being static relative to the head 14, and thus the transducers are notionally measuring the position of the stylus tip relative to the head 14. As with the preferred embodiment of the present invention it is possible to reduce the number of locations to which the stylus must be moved to three, by measuring the translation vector $V_T$. This is done by driving the head 14 into a position at which the probe transducers are zero (i.e. the stylus tip 16 is at the origin of the probe coordinate system), when the measuring tip 16 is engaged in the first of the locations $L_1$ to $L_6$. The head 14 is then kept in this position for the remaining three measurements.

The measured values of $[f_n,g_n,h_n]$ and $[F_n,G_n,H_n]$ are entered into a computer, which then determines and stores the rotation matrix R. Measured values of the coordinate position of the stylus in the probe coordinate system PCS may then be sent to the computer (after being quantised where necessary by an analogue-to-digital converter) which then outputs a coordinate position in the machine coordinate system.

As stated above, the axes of the probe coordinate system are defined by the physical structure of the probe. It is thus unlikely (due to manufacturing tolerances) that the axes of the probe coordinate system will be exactly orthogonal. However, if this is the case, and the translation vector $V_T$ has been eliminated from the equation by measuring the origin of the probe coordinate system, then the number of measured points (either of the position of the head 14, or the measuring tip 16) required is only two, not including the measurement required to eliminate the translation vector $V_T$. This is because if the axes of the probe coordinate system are perfectly orthogonal then the following relationship between the unit vectors of the probe coordinate system exists:

$$i \times j = k$$

I claim:

1. A method of obtaining data for calibrating a coordinate positioning machine having a head supported for movement relative to a bed, means for measuring the position of the head relative to a datum, and an analogue probe connected to the head, the probe supporting a stylus having a tip for movement relative to the head, the probe further comprising means for measuring the relative position of the stylus tip and head, the method comprising the steps of:

fixing, relative to the bed of the machine, the position of one of the stylus tip and head;

with the position of said one of the stylus tip and head fixed, moving the other of the stylus tip and head to a plurality of locations; and at each of said locations, measuring the position of said other of the stylus tip and head relative to said one of the stylus tip and head, and the position of said other of the stylus tip and head relative to the datum.

2. A method according to claim 1 wherein the head is moveable in three dimensions relative to the bed in a machine coordinate system having said datum as its origin, and the probe further comprises a plurality of transducers for measuring relative displacement of the head and the stylus tip in a three-dimensional probe coordinate system whose origin is fixed relative to the stylus tip and defined by zero output of each of said transducers, and wherein the method comprises the steps of:

fixing the position of the stylus tip relative to the bed of the machine;

with the position of the stylus tip fixed, moving the head of the machine to each of said locations; and at each of said locations, measuring the position of the head in the probe coordinate system, and the position of the head in the machine coordinate system.

3. A method according to claim 2 further comprising the steps of:

with the position of the stylus tip fixed, moving the head of the machine to a calibration location at which the probe transducer outputs are zero; and defining said calibration location as said datum and thus as the origin of the machine coordinate system.

4. A method according to claim 3 wherein the axes of the probe coordinate system are orthogonal, and the head is moved to at least two locations subsequent to the calibration location.

5. A method according to claim 3 wherein the axes of the probe coordinate system are not orthogonal, and the head is moved to at least three locations subsequent to the calibration location.

6. A method according to claim 2 further comprising the steps of:

with the position of the tip of the stylus fixed in the machine coordinate system, moving the head to a calibration location within the machine coordinate system at which the stylus lies at the origin of the probe coordinate system;

measuring the coordinate position of the head within the machine coordinate system, and determining a translation vector $V_T$ for translating the origin of the probe coordinate system into the origin of the machine coordinate system.

7. A method according to claim 6 wherein the axes of the probe coordinate system are orthogonal, and the head is moved to at least two locations subsequent to the calibration location.

8. A method according to claim 6 wherein the axes of the probe coordinate system are not orthogonal, and the head is moved to at least three locations subsequent to the calibration location.

9. A method according to claim 2 wherein the axes of the probe coordinate system are not orthogonal, and the number of locations to which the head is moved is at least six.

10. A method according to claim 1 wherein the head is movable in three dimensions relative to the bed in a machine coordinate system having said datum as its origin, and the probe further comprises a plurality of transducers for measuring relative displacement of the head and the stylus tip in a three-dimensional probe coordinate system whose origin is fixed relative to the head and defined by zero output of each of said transducers, and wherein the method comprises the steps of:

measuring the positions of a plurality of predetermined locations within the machine coordinate system;

fixing the position of the head relative to the bed of the machine;

with the position of the head fixed, moving the stylus tip to each of said predetermined locations; and measuring at each of said predetermined locations the position of the stylus tip in the probe coordinate system.

11. A method according to claim 10 further comprising the steps of:

with the stylus tip fixed in the first one of said predetermined locations, moving the head of the machine to a calibration location at which the probe transducer outputs are zero; and defining said calibration location as said datum and thus as the origin of the machine coordinate system.

12. A method according to claim 11 wherein the axes of the probe coordinate system are orthogonal, and the stylus tip is moved to at least two said predetermined locations subsequent to the first said predetermined location.

13. A method according to claim 11 wherein the axes of the probe coordinate system are not orthogonal, and the stylus tip is moved to at least three said predetermined locations subsequent to said first predetermined location.

14. A method according to claim 10, further comprising the steps of:

with the tip of the stylus positioned at the first of said predetermined locations, moving the head to a location within the machine coordinate system at which the stylus tip lies at the origin of the probe coordinate system;

measuring the coordinate position of the head at said location within the machine coordinate system; and determining a translation vector $V_T$ for translating the origin of the probe coordinate system into the origin of the machine coordinate system.

15. A method according to claim 14 wherein the axes of the probe coordinate system are orthogonal, and the number of locations to which the head is moved is at least two.

16. A method according to claim 14 wherein the axes of the probe coordinate system are not orthogonal and the number of locations to which the head is moved is at least three.

17. A method according to claim 10 wherein the axes of the probe coordinate system are not orthogonal and the number of locations to which the head is moved is at least six.

18. A method according to claim 1 wherein the number of locations to which said other of the stylus tip and head is moved is at least six.

19. A method according to claim 1 wherein: the head is movable in three dimensions relative to the bed in a machine coordinate system X,Y,Z, having said datum as its origin; the probe further comprises a plurality of transducers for measuring relative displacement of the head and the stylus tip in a three-dimensional probe coordinate system x,y,z whose origin is fixed relative to one of the stylus tip and head, and defined by zero output of each of said transducer; and wherein the method comprises the steps of:

using the measured data values of the position of the head relative to said datum, and (b) the position of said one of the stylus tip and head relative to the origin of the probe coordinate system to solve simultaneously an equation of the form:

$$[F_n I + G_n J + H_n K] = [f_n i + g_n j + h_n k] + [-F_T I + G_T J + H_T K]$$

where:

I, J, K are unit vectors of X, Y, Z axes of the machine coordinate system;

i, j, k, are unit vectors of x,y,z axes of the probe coordinate system;

$F_T$, $G_T$, $H_T$ are the X, Y, Z coordinates of the origin of the probe coordinate system in the machine coordinate system;

$F_n$, $G_n$, $H_n$ are the X, Y, Z coordinates of the head in the machine coordinate system; and $f_n$, $g_n$, $h_n$ are the x, y, z coordinates of said one of the head and stylus tip relative to the origin of the probe coordinate system;

and determining from said equation the orientation of i, j, k relative to I, J, K.

20. A coordinate positioning machine comprising:
a bed;
a head supported for movement relative to the bed;
an analogue probe connected to the head supporting a stylus having a tip for movement through a permitted range of distance relative to the head, and having means for measuring a position of the stylus tip in a probe coordinate system; and
a calibration block comprising at least three locations for a sphere, each location lying within a distance of each other location which is equal to the magnitude of the premitted range of movement of the stylus tip in a single plane with the head fixed.

21. A machine according to claim 20 wherein each location comprises three mutually convergent surfaces.

22. A machine according to claim 20 wherein each location comprises a concial recess.

* * * * *